US006673258B2

(12) United States Patent
Purizhansky

(10) Patent No.: US 6,673,258 B2
(45) Date of Patent: Jan. 6, 2004

(54) MAGNETICALLY RESPONSIVE FOAM AND MANUFACTURING PROCESS THEREFOR

(75) Inventor: Edward M. Purizhansky, Williamsville, NY (US)

(73) Assignee: TMP Technologies, Inc., Buffalo, NY (US)

( * ) Notice: Subject to any disclaimer, the term of this patent is extended or adjusted under 35 U.S.C. 154(b) by 23 days.

(21) Appl. No.: 09/975,551

(22) Filed: Oct. 11, 2001

(65) Prior Publication Data

US 2003/0089881 A1 May 15, 2003

(51) Int. Cl.[7] .......................... H01F 1/117; H01F 1/28; H01F 1/375; C08J 9/02; C08J 9/04

(52) U.S. Cl. .................................................. 252/62.54

(58) Field of Search ........................... 252/62.52, 62.54

(56) References Cited

U.S. PATENT DOCUMENTS

| | | | | |
|---|---|---|---|---|
| 2,993,013 A | | 7/1961 | Wolfe | 260/2.5 |
| 3,805,532 A | | 4/1974 | Kistner | 61/36 R |
| 3,890,224 A | | 6/1975 | Weiss et al. | 210/30 |
| 4,137,200 A | | 1/1979 | Wood et al. | 521/159 |
| 4,187,187 A | * | 2/1980 | Turbeville | 252/62.54 |
| 4,200,524 A | | 4/1980 | Levin | 210/5 |
| 4,234,420 A | | 11/1980 | Turbeville | 210/671 |
| 4,341,875 A | | 7/1982 | Visger et al. | 521/164 |
| 4,576,718 A | | 3/1986 | Reischl et al. | 210/616 |
| 4,734,439 A | | 3/1988 | Reischl | 521/54 |
| 4,801,621 A | | 1/1989 | Reischl | 521/53 |
| 4,843,105 A | | 6/1989 | Reischl et al. | 521/54 |
| 4,855,052 A | | 8/1989 | Reischl | 210/632 |
| 4,871,790 A | | 10/1989 | Lamanna et al. | 523/333 |
| 5,135,472 A | | 8/1992 | Hermann et al. | 602/41 |
| 5,382,373 A | | 1/1995 | Carlson et al. | 252/62.55 |
| 5,505,880 A | | 4/1996 | Kormann et al. | 252/62.54 |
| 5,525,249 A | | 6/1996 | Kordonsky et al. | 252/62.56 |
| 5,578,238 A | | 11/1996 | Weiss et al. | 252/62.52 |
| 5,645,752 A | | 7/1997 | Weiss et al. | 252/62.54 |
| 5,804,095 A | | 9/1998 | Jacobs et al. | 252/62.52 |
| 5,849,239 A | | 12/1998 | Harris | 264/408 |
| 5,906,767 A | | 5/1999 | Karol et al. | 252/62.52 |
| 5,985,168 A | | 11/1999 | Phule | 252/62.52 |
| 6,151,930 A | | 11/2000 | Carlson | 68/12.06 |
| 6,158,910 A | | 12/2000 | Jolly et al. | 401/6 |
| 6,159,396 A | | 12/2000 | Fujita et al. | 252/572 |

FOREIGN PATENT DOCUMENTS

| | | | |
|---|---|---|---|
| JP | 09-102411 | * | 4/1997 |

* cited by examiner

*Primary Examiner*—C. Melissa Koslow
(74) *Attorney, Agent, or Firm*—Walter W. Duft

(57) ABSTRACT

A magnetically responsive foam has a three-dimensional cellular structure comprising the reaction product of a liquid phase foam system to which has been added a magnetic fluid and a blowing agent.

20 Claims, 2 Drawing Sheets

MAGNETICALLY RESPONSIVE FOAM AND MANUFACTURING PROCESS THEREFOR

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to foams, and particularly foams manufactured to possess special purpose properties.

By way of background, there has been increasing interest in the development of foam products having specialized properties not found in conventional foams. One such property is magnetic responsiveness.

In the prior art, magnetically responsive foams have been produced by incorporating a metallic powder comprising ferromagnetic particles of relatively large size (e.g., 100–1500 micron iron particles) into a liquid phase foam system by way of mechanical impregnation during the foaming process. This approach is disclosed in U.S. Pat. No. 4,234,420 of Turbeville, which is directed to the manufacture and use of magnetically recoverable, oil sorbent foam particles for pollutant spill control. A disadvantage of this technique (as noted in the above-referenced patent) is that the metallic particles, depending on their size and abrasiveness, tend to cause varying amounts of disintegrative destruction of the foam over the course of multiple compression-recovery cycles. Furthermore, it has been observed by Applicant that the metallic particles are not well disbursed throughout the foam, and those particles which are at or near the surface of the foam tend to become readily dislodged from the foam matrix. These disadvantages may be acceptable if the foam is intended for use in granular or particulate form (such as for oil recovery), but there are many applications where requirements of foam structural integrity, uniform magnetic particle dispersion, and particle fastness/securement may preclude use of the above-described production technique.

Accordingly, an improved technique is needed for producing magnetically responsive foam. What is required is a magnetically responsive foam, and a manufacturing method therefor, in which the foam is imparted with magnetic properties, e.g., ferromagnetism, diamagnetism, paramagnetism, without the attendant disadvantages of the prior art approach described above.

BRIEF SUMMARY OF THE INVENTION

It is an object of the present invention to provide an improved magnetically responsive foam and a foam manufacturing method therefor.

Another object of the present invention is to provide an improved magnetically responsive foam and a foam manufacturing method therefor wherein magnetically responsive material is incorporated into the foam in a manner that prevents the material from readily leeching out, even under harsh environmental conditions.

Still another object of the present invention is to provide an improved magnetically responsive foam and a foam manufacturing method therefor wherein magnetically responsive material is incorporated into the foam in a uniformly dispersed manner that does not impair the foam's structural or functional properties.

Applicant has discovered that the foregoing objectives can be satisfied by a magnetically responsive foam having a three-dimensional cellular structure comprising the reaction product of a liquid phase foam system to which has been added a blowing agent and a magnetic fluid comprising a suspension of magnetically responsive particles in a liquid carrier. Applicant has observed, in particular, that by selecting an appropriate magnetic fluid and liquid phase foam system, the liquid carrier portion of the magnetic fluid appears to chemically react with one or more of the foam constituents, or a reaction product thereof, during the foaming chain reaction process, so as to become bound into the foam's molecular structure. This tends to trap the magnetically responsive particles suspended in the liquid carrier, such that they do not readily leach out of the foam, even under adverse environmental conditions.

Suitable magnetic fluids include magnetorheological fluids and colloidal magnetic fluids (also known as ferrofluids). The magnetically responsive particles may comprise ferromagnetic material, diamagnetic material, paramagnetic material, etc., depending on the desired properties of the foam. Suitable liquid carriers include, but are not necessarily limited to, silicone-based, oil-based, and water-based liquid carrier systems. Suitable foam systems include, but are not necessarily limited to, polymeric foams, and particularly urethane foams, including non-hydrophilic and hydrophilic varieties thereof. The foams may be non-reticulated, or they may be subjected to a reticulation process to produce reticulated foams.

For urethane foams, the liquid phase foam system may include a polyol, an isocyanate or polyisocyanate, a catalyst and a surfactant. The blowing agent may be water that evolves into carbon dioxide upon addition to the liquid phase foam system. The catalyst may comprise any suitable urethane catalyst material, including amine catalysts and tin catalysts. The magnetic fluid may be incorporated at a weight ratio of between about 5–60 parts of the magnetic fluid to about 145 parts of a mixture of the polyol, the isocyanate or polyisocyanate, the blowing agent, the catalyst and the surfactant.

According to one exemplary embodiment of the invention, a mixture may be prepared which contains (by weight) about 100 parts polyol, about 29 parts isocyanate, about 28.5 parts magnetic fluid, about 3.5 parts water, about 0.3 parts silicone surfactant, and about 0.67 parts catalyst. Additionally, about 10.9 parts glycol may also be added. Many other embodiments of the invention may be produced by varying the nature and quantity of the ingredients that comprise the mixture.

Following mixing of the selected ingredients, a gaseous phase foam system is produced, which then conventionally cures into a solidified foam product having the magnetic fluid bound therein.

BRIEF DESCRIPTION OF THE SEVERAL VIEWS OF THE DRAWING

The various aspects of the present invention will be more fully understood when the following portions of the specification are read in conjunction with the accompanying drawing wherein.

DETAILED DESCRIPTION OF THE INVENTION

Figure 1:
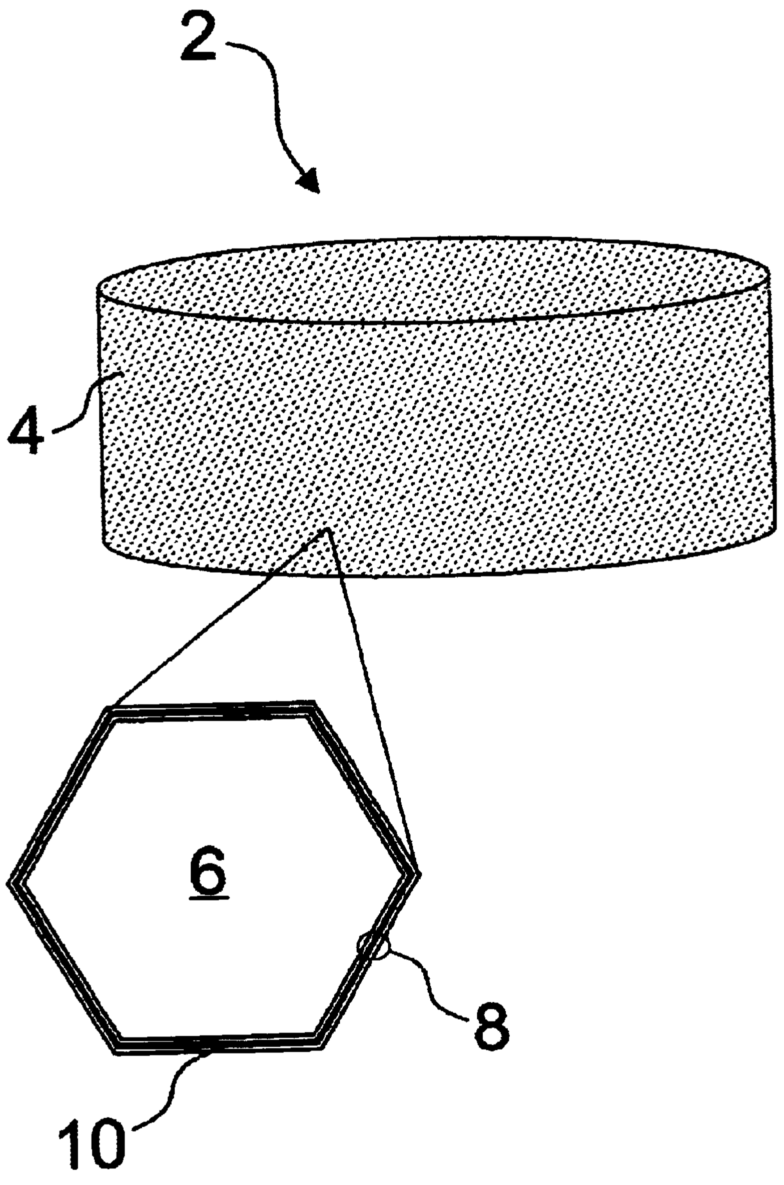
FIG. 1 is a perspective view of a magnetically responsive foam article made in accordance with the invention.

Turning now to FIG. 1, an improved magnetically responsive foam article 2 is shown which is made in accordance with the present invention. The foam article 2 has a three-dimensional cellular structure 4 comprising the reaction product of a liquid phase foam system to which has been added a blowing agent and a magnetic fluid comprising a suspension of magnetically responsive particles in a liquid carrier. The cellular structure 4 comprises a plurality of cells 6 (as shown in the inset portion of FIG. 1), each of which is defined by cell walls 8. Dispersed substantially uniformly throughout the cellular structure 4 is a magnetic fluid material 10. Importantly, the magnetic fluid 10 is believed to be incorporated into the molecular structure of the cell walls 8, by chemical bonding, such that it will not leech out of the matrix 4.

Suitable magnetic fluids include silicone-based, oil-based, and water-based liquid carrier systems having magnetically responsive particles suspended therein. Exemplary silicone-based liquid carriers include silicone oils, silicone copolymers, fluorinated silicone, and other polysiloxane compositions. Exemplary oil-based liquid carriers include mineral oils, lubricating oils, transformer oils and other oil compositions. The liquid carrier will typically have a viscosity ranging from about 2 to 1000 centipoise at 25° C., although materials with lower or higher viscosities could also be used.

The magnetically responsive particles may range from submicron size (e.g., 5 nanometers or less) up to micron size (e.g., 1000 microns or more). The particles may be ferromagnetic in nature (e.g., carbonyl iron, iron alloys, etc.) or they may be diamagnetic, paramagnetic, or the like, depending on the desired properties of the foam. They will typically comprise from about 5 to 50 percent by volume of the total magnetic fluid, although lower or higher concentrations could also be used. Note that if the particle size is on the order of about 5–10 nanometers, the magnetic fluid may be considered a colloidal magnetic fluid. If the particle size is on the order of about 0.1–500 microns, it may be considered a magnetorheological fluid.

Magnetorheological fluids have been found to be particularly suited for use with the present invention. One producer of such fluids is Lord Corporation of Cary, N.C. An exemplary silicone-based magnetorheological fluid that may be used to practice the present invention is sold by Lord Corporation under the designation MRF-336AG. An exemplary oil-based magnetorheological fluid that may be used to practice the present invention is sold by Lord Corporation under the designation MRF-132LD. An exemplary water-based magnetorheological fluid that may be used to practice the present invention is sold by Lord Corporation under the designation MRF-240BS. U.S. Pat. No. 5,382,373 of Carlson et al., and U.S. Pat. No. 5,578,238 of Weiss et al., both assigned to Lord Corporation, disclose methods for making magnetorheological fluids.

Suitable foam systems that may be used to practice the invention include, but are not necessarily limited to, polymeric foams, and particularly urethane foams, including non-hydrophilic and hydrophilic varieties thereof. The foams may be non-reticulated, or they may be subjected to a reticulation process to produce reticulated foams.

A urethane foam for use in practicing the invention can be made from the usual urethane prepolymers and blowing agents. Urethane prepolymers are conventionally prepared by reacting a material having a plurality of active hydrogen atoms, such as a polyoxyethylene polyol, with an amount of organic isocyanate (or polyisocyanate) in excess of stoichiometry. Exemplary isocyanates and polyisocyanates include:

toluene-2,4-diisocyanate;
m-phenylenediisocyanate;
4-chloro-1,3-phenylenediisocyanate;
4,4'-biphenyldiisocyanate;
1,5-naphthylenediisocyanate;
1,4-teramethylenediisocyanate;
1,6-hexamethylenediisocyanate;
4,4'-methylenediphenylisocyanate;
1,10-decamethylenediisocyanate;
1,4-cyclohexylenediisocyanate;
4,4'-methylene-bis(cyclohexylisocyanate); and
1,5-tetrahdronaphthylenediisocyanate.

For a urethane foam, the liquid phase foam system of the invention will preferably include a suitable polyol and an isocyanate or polyisocyanate, together with a catalyst and a surfactant. Suitable catalysts include tertiary amine catalysts, tin catalysts, and combinations thereof. Suitable surfactants include silicone surfactants. The blowing agent used to produce foaming in a urethane foam is typically water that evolves into carbon dioxide upon addition to the liquid phase foam system. Glycol may also be added to the liquid phase foam system.

A magnetic fluid may be incorporated into a mixture of a liquid phase urethane foam system and an aqueous blowing agent at a weight ratio of between about 5–60 parts of the magnetic fluid to about 145 parts of the combined ingredients of the liquid phase foam system and the blowing agent. Higher or lower concentrations of the magnetic fluid could also be used, but the foregoing weight ratio range is preferred so that, on one hand, there is at least minimal useful magnetic activity, and on the other hand, there is no degradation of the foam's mechanical properties. A more preferred weight ratio is about 20–45 parts of the magnetic fluid to about 145 parts of the combined ingredients of the liquid phase foam system and the blowing agent. A most preferred weight ratio is about 25–35 parts of the magnetic fluid to about 145 parts of the combined ingredients of the liquid phase foam system and the blowing agent.

Following mixing of the above ingredients, a gaseous phase foam system is produced. Upon curing, the gaseous phase foam system will solidify into a solid phase foam product having the magnetic fluid bound therein, and possessing magnetic properties.

Example—Non-Reticulated, Non-Hydrophilic Urethane Foam

A magnetically responsive, non-reticulated, non-hydrophilic urethane foam in accordance with the invention was produced using the following ingredients:

| Ingredient | Parts By Weight |
|---|---|
| ET327 polyol made by Arco Chemical Co. | 100 |
| De-ionized Water | 3.5 |
| Terathane 250 glycol made by DuPont Co. | 10.9 |
| Dabco BL11 tertiary amine catalyst made by Air Products and Chemicals Co. | 0.14 |
| Dabco 33LV tertiary amine catalyst made by Air Products and Chemicals Co. | 0.49 |
| DC193 silicone surfactant made by Dow Corning Co. | 0.3 |
| Dabco NCM tertiary amine catalyst made by Air Products and Chemicals Co. | 0.4 |
| 233 isocyanate made by BASF Co. | 49 |
| MRF-336AG magnetorheological fluid made by Lord Corp. | 28.5 |

The MRF-336AG magnetorheological fluid used in this example comprises a silicone-based liquid carrier. Although the precise formulation of the carrier is proprietary to the manufacturer, it is believed to comprise silicone oil. The remaining foam system components are all conventional in nature.

The procedure for preparing the foam was to combine all of the above ingredients, except for the isocyanate, and stir the combined ingredients until thoroughly mixed. The isocyanate was then added to activate the foaming process. Magnetically responsive foam samples were obtained upon solidification (curing) of the foregoing mixture into a solid foam product.

For testing purposes, additional foam samples were produced according to the above formulation, but with the silicone-based magnetorheological fluid being respectively replaced with a magnetorheological fluid comprising an oil-based liquid carrier (Lord MRF-132LD) and a magnetorheological fluid comprising a water-based liquid carrier (Lord MRF-240BS). Although the precise formulation of the oil-based carrier of the MRF-132LD product is proprietary to the manufacturer, it is believed to comprise mineral oil. The water-based carrier of the MRF-240BS is believed to comprise ordinary water that may or may not be de-ionized.

Figure 2:
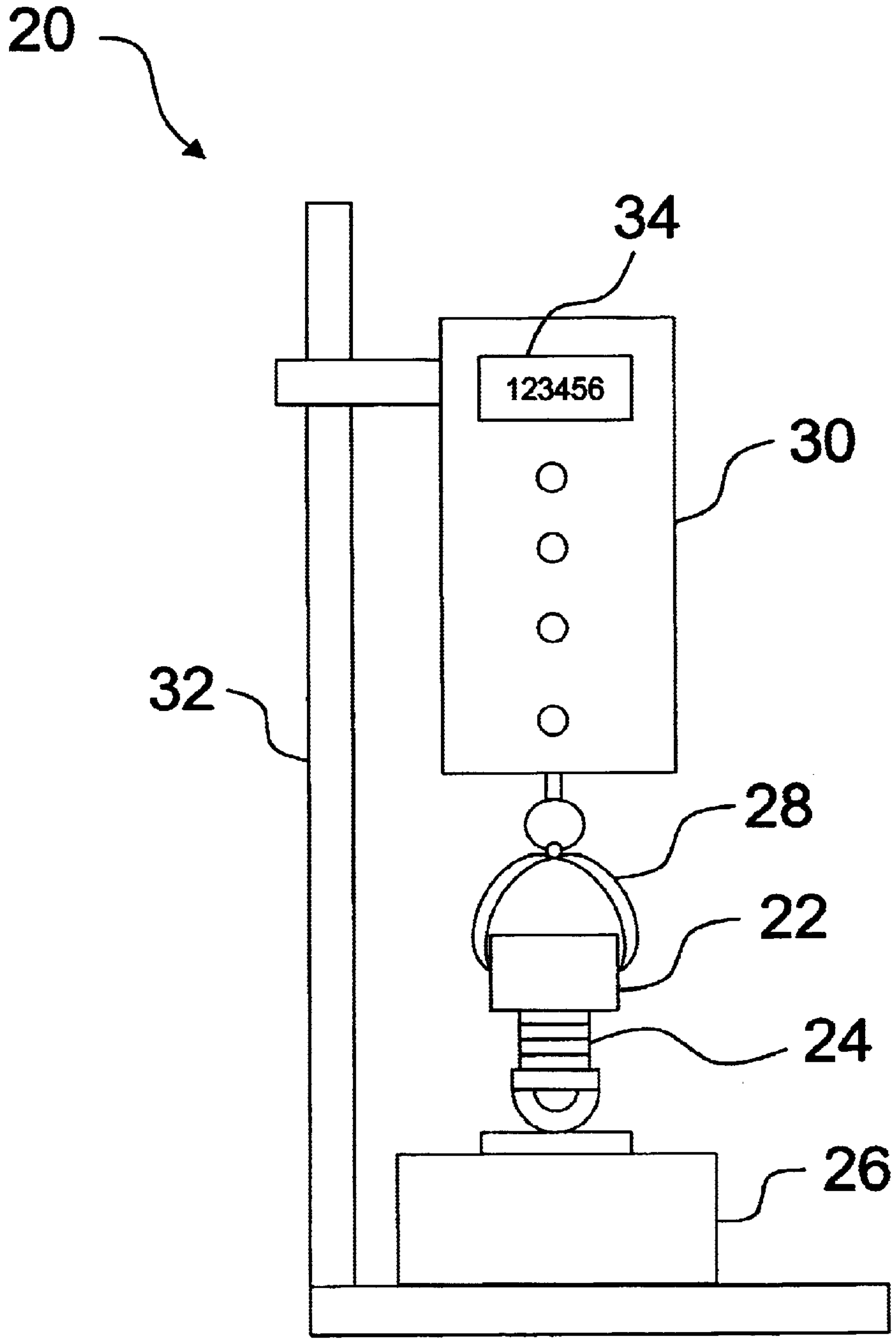
FIG. 2 is a side elevational view of a test apparatus used for testing foam samples produced according to the invention.

In the ensuing discussion, the three species of samples produced according to the above example will be respectively referred to as silicone-based samples, oil-based samples, and water-based samples. Each of the three sample species was tested for magnetic properties using the test fixture 20 of FIG. 2. During testing, the bottom of each test piece 22 was held by magnetic attraction to a stack of permanent magnets 24 secured to a base 26. The top of each test piece 22 was held by a clamp 28. The clamp 28 was mounted to a vertically adjustable portion of a Chatillion DFM2 force gauge 30. The force gauge 30 was secured to a stand 32 extending upwardly from the base 26. After the clamp 28 was secured to the test piece 22, it was pulled vertically upwardly by the force gauge 30. The pull force applied to the clamp 28 was displayed on the force gauge display 34. The force at which the test piece 22 separated from the magnets 24 was read and recorded.

In all cases, the tested samples exhibited magnetic ferromagnetic strength, meaning that a measurable force (in pounds) was required to separate the test pieces 22 from the magnets 24. In addition, the samples were tested under three different environmental conditions to assess their ability to retain ferromagnetic strength following adverse environmental exposure. A first group of samples was soaked in water for twenty-four hours. A second group of samples was washed with soap and water. A third group of samples was boiled in water for one hour. Tables 1, 2 and 3 below illustrate the results of the foregoing testing, with two of each species of sample being tested for ferromagnetic strength before and after environmental treatment. The reported test values represent ferromagnetic strength (in pounds) for each sample.

TABLE 1

SOAK IN WATER FOR TWENTY-FOUR HOURS

| SOAK | FERROMAGNETIC STRENGTH (LBS) | | | | | |
|---|---|---|---|---|---|---|
| | OIL-BASED SAMPLE | | SILICONE-BASED SAMPLE | | WATER-BASED SAMPLE | |
| (IN WATER FOR 24 HOURS) | 1 | 2 | 1 | 2 | 1 | 2 |
| BEFORE SOAK | 0.400 | 0.318 | 0.254 | 0.240 | 0.040 | 0.034 |
| AFTER SOAK | 0.266 | 0.268 | 0.282 | 0.238 | 0.020 | 0.024 |

TABLE 2

WASH WITH SOAP AND WATER

| WASH | FERROMAGNETIC STRENGTH (LBS) | | | | | |
|---|---|---|---|---|---|---|
| | OIL-BASED SAMPLE | | SILICONE-BASED SAMPLE | | WATER-BASED SAMPLE | |
| (WITH SOAP AND WATER) | A | B | A | B | A | B |
| BEFORE WASH | 0.216 | 0.218 | 0.242 | 0.230 | 0.026 | 0.034 |
| AFTER WASH | 0.226 | 0.201 | 0.246 | 0.226 | 0.024 | 0.020 |

TABLE 3

BOIL IN WATER FOR ONE HOUR

| BOIL | FERROMAGNETIC STRENGTH (LBS) | | | | | |
|---|---|---|---|---|---|---|
| | OIL-BASED SAMPLE | | SILICONE-BASED SAMPLE | | WATER-BASED SAMPLE | |
| (IN WATER FOR 24 HOURS) | X | O | X | O | X | O |
| BEFORE BOIL | 0.213 | 0.136 | 0.225 | 0.261 | 0.020 | 0.032 |
| AFTER BOIL | 0.170 | 0.142 | 0.206 | 0.298 | 0.012 | 0.016 |

The test results show that the silicone-based samples, with a median initial ferromagnetic strength of 0.241 pounds, generally had greater ferromagnetic strength prior to environmental exposure than both the oil-based samples (median initial ferromagnetic strength of 0.217 pounds) and the water-based samples (median initial ferromagnetic strength of 0.033 pounds). The water-based samples were clearly the worst performers in terms of ferromagnetic strength. Their median initial ferromagnetic strength prior to environmental exposure was only 14% of the comparable strength rating for the silicone-based samples and 15% of the comparable strength rating associated with the oil-based samples.

In terms of environmental resistance, the silicone-based samples were again the best performers. For the silicone-based samples, each environmental test showed one of the samples losing a slight amount of strength and the other sample appearing to gain in strength. These differences are attributable to test noise and are considered statistically insignificant. The test results thus appear to demonstrate the ability of the silicone-based samples to maintain their ferromagnetic strength despite the presence of all three of the tested environmental conditions.

For the oil-based samples, the washing and boiling tests resulted in one sample losing strength and the other gaining strength. Assuming these results are attributable to test noise, it may be concluded that the oil-based samples are resistant to the washing and boiling environmental conditions. For the soaking test, both oil-based samples lost strength, thus suggesting that the oil-based samples are susceptible to the soaking environmental condition.

The water-based samples were the weakest performers in terms of environmental resistance, with all samples losing ferromagnetic strength as a result of environmental exposure, some by as much as 50% of their initial strength values.

Applicant attributes the superior performance of the silicone-based and oil-based samples to the ability of the liquid carrier portion of their respective magnetorheological fluids to chemically react with one or more of the foam constituents, or a reaction product thereof, during the foaming chain reaction process, so as to become bound into the foam's molecular structure. It is believed that this tends to trap the very fine magnetically responsive particles of the magnetorheological fluid within the molecular structure, such that they do not readily leech out of the foam, even under adverse environmental conditions. This hypothesis was confirmed in part by observing samples of urethane foams that were made by introducing 20 mesh iron powder directly into the liquid phase urethane foam system. When these samples were manipulated by hand, a significant amount of the iron powder became dislodged from the foam, rendering them undesirable for further testing.

Accordingly, a novel magnetically responsive foam and related manufacturing method have been shown and described. While various embodiments of the invention have been disclosed, it should be apparent that many variations and alternative implementations thereof would be apparent to those skilled in the art in view of the teachings herein. It is understood, therefore, that the invention is not to be limited except in accordance with the spirit of the appended claims and their equivalents.

What is claimed is:

1. A method for manufacturing a magnetically responsive foam product, comprising the steps of:

creating a liquid phase foam system;

adding a magnetic fluid to said liquid phase foam system;

blowing said liquid phase foam system into a gaseous phase foam system; and curing said gaseous phase foam system into a solidified foam product having said magnetic fluid bound therein.

2. A method as set forth in claim 1 wherein said magnetic fluid is silicone-based.

3. A method as set forth in claim 1 wherein said magnetic fluid is oil-based.

4. A method as set forth in claim 1 said magnetic fluid is water-based.

5. A method as set forth in claim 1 wherein said magnetic fluid is a magnetorheological fluid comprising magnetically responsive particles suspended in a liquid carrier, said particles having a particle size of between about 0.1–500 microns.

6. A method as set forth in claim 1 wherein said solidified foam product comprises a urethane foam.

7. A method as set forth in claim 6, wherein said solidified foam product comprises a non-hydrophilic foam.

8. A method as set forth in claim 7, wherein said solidified foam product comprises a non-reticulated foam.

9. A method as set forth in claim 1, wherein said liquid phase foam system comprises, a polyol, an isocyanate or polyisocyanate, a catalyst, and a surfactant, and wherein said blowing step includes combining said liquid phase foam system with a gas producing blowing agent.

10. A method as set forth in claim 9, wherein said blowing agent comprises water.

11. A method as set forth in claim 9, wherein said catalyst comprises a tertiary amine catalyst.

12. A method as set forth in claim 9, wherein said surfactant comprises silicone.

13. A method as set forth in claim 9, wherein said magnetic fluid is present at a weight ratio of between about 5–60 parts of said magnetic fluid to about 145 parts of a mixture of said polyol, said isocyanate or polyisocyanate, said blowing agent, said catalyst and said surfactant.

14. A method as set forth in claim 1, wherein said creating, adding and blowing steps are performed by mixing (by weight) about 100 parts polyol, about 29 parts isocyanate, about 28.5 parts magnetic fluid, about 3.5 parts water, about 0.3 parts silicone surfactant, about 10.9 parts glycol, and about 0.67 parts tertiary amine catalyst.

15. A magnetically responsive foam having a magnetically responsive, three-dimensional cellular structure comprising the reaction product of a liquid-phase foam system of a polyol, an isocyanate or polyisocyanate, a catalyst and a surfactant, to which has been added a magnetic fluid and a blowing agent.

16. A magnetically responsive foam as set forth in claim 15, wherein said cellular structure comprises the reaction product of between about 5–60 parts of said magnetic fluid to about 145 parts of said mixture of said liquid phase foam system and said blowing agent.

17. A magnetically responsive foam as set forth in claim 16, wherein there is about 20–45 parts by weight of said magnetic fluid.

18. A magnetically responsive foam as set forth in claim 16, wherein there is about 25–35 parts by weight of said magnetic fluid.

19. A magnetically responsive foam as set forth in claim 16, wherein there is about 28.5 parts by weight of said magnetic fluid.

20. A method for manufacturing a magnetically responsive foam, comprising the steps of:

creating a mixture of a liquid phase foam system, a blowing agent and a magnetic fluid containing a suspension of magnetically responsive particles in a liquid carrier adapted to chemically bond with a constituent or reaction product of said liquid phase foam system;

allowing said mixture to foam into a gaseous phase foam system; and curing said gaseous phase foam system into a solidified foam product having said magnetic fluid bound therein.

* * * * *